Patented Aug. 30, 1938

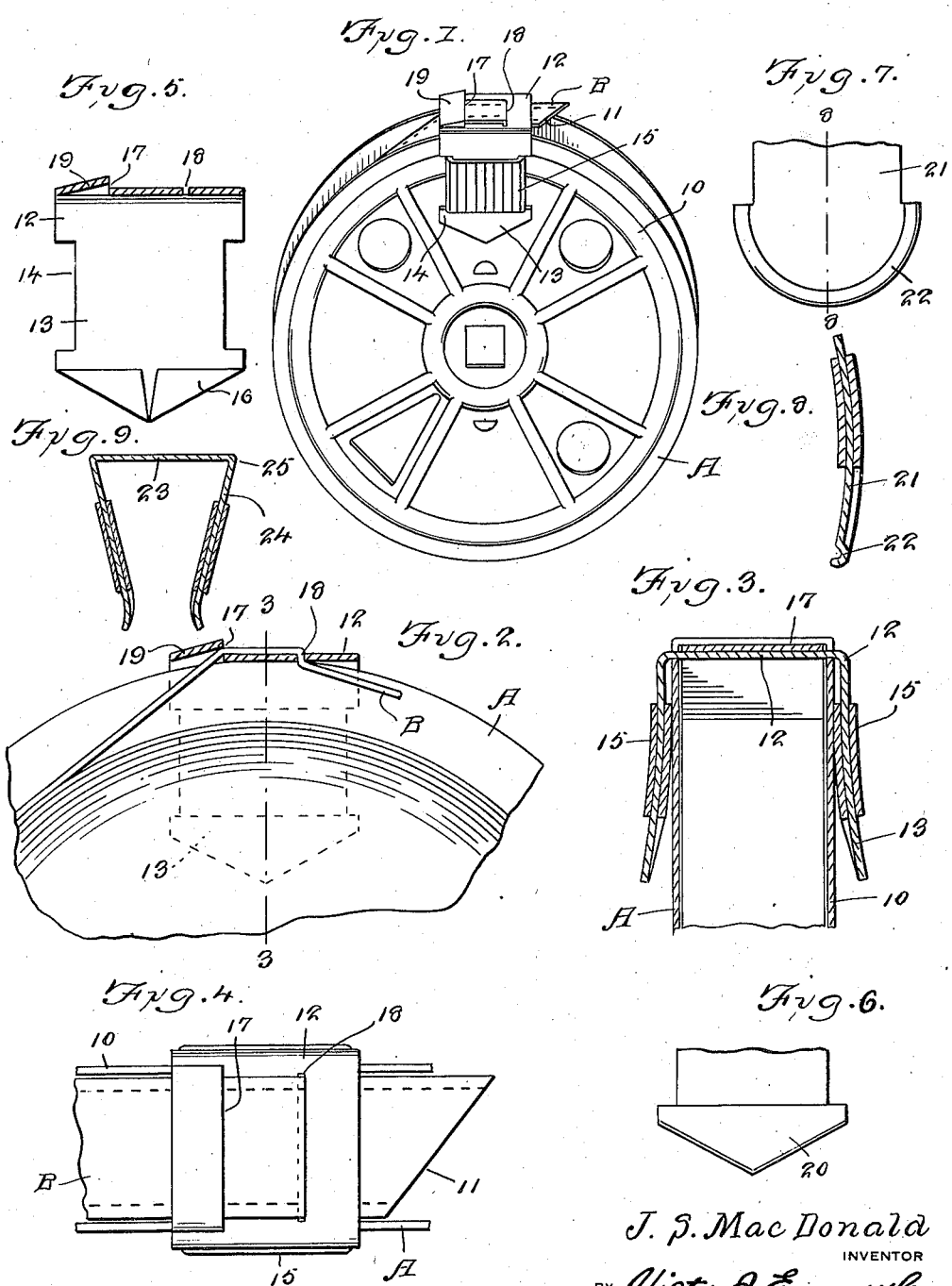

2,128,710

UNITED STATES PATENT OFFICE 2,128,710

MOTION PICTURE FILM END CLIP FOR REELS

John Sydney MacDonald, Highland Park, Mich.

Application March 30, 1936, Serial No. 71,787

3 Claims. (Cl. 206—53)

The invention relates to a film end clip and more especially to an end retainer for motion picture film when upon a reel or spool.

The primary object of the invention is the provision of a clip of this character, wherein the end of a motion picture film when upon a reel or spool can be fastened so as to protect such film to avoid scratching, cutting or damage thereto and at the same time holding the film properly, tightly and completely wound upon the spool or reel.

Another object of the invention is the provision of a clip of this character, wherein the same is frictionally engageable upon a reel or spool and when in engaged position can receive the end of a film when wound upon said reel or spool, the fastening of the end of the film being easily effected and when the clip is engaged with the spool or reel the film will be retained and tightly wound thereon.

A further object of the invention is the provision of a clip of this character, wherein the construction thereof is novel in form and when the film end is engaged therewith and the said clip engaged with the reel or spool there is no liability of the twisting or tangling of the film when feeding the same to a projector as the film will be held wound and thus cannot jump from the spool or reel for the tangling or twisting thereof.

A still further object of the invention is the provision of a clip of this character, which is extremely simple in construction, thoroughly reliable and efficient in its purpose, readily and easily applied to the spool or reel, enabling the fastening of the end of the film upon the spool or reel with dispatch, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a perspective view of the spool or reel with a film wound thereon showing the clip constructed in accordance with the invention applied.

Figure 2 is a fragmentary vertical sectional view through the reel or spool and the clip.

Figure 3 is a sectional view on the line 3—3 of Figure 2.

Figure 4 is a plan view of the clip.

Figure 5 is a vertical sectional view through the clip.

Figure 6 is a fragmentary side elevation of a slight modification.

Figure 7 is a view similar to Figure 6 showing a further modification.

Figure 8 is a sectional view on the line 8—8 of Figure 7.

Figure 9 is a vertical transverse sectional view through a still further modification.

Similar reference characters indicate corresponding parts throughout the several views in the drawing.

Referring to the drawing in detail, particularly Figures 1 to 5 inclusive, A designates generally a spool or reel of that construction employed for the winding and unwinding of a motion picture film B on and from the same and includes opposite spaced uniformly sized disk-like side cheeks 10, the film B being wound upon the arbor of said spool A and the outer end of this film is diagonally cut at 11 for a purpose presently described.

The clip constituting the present invention comprises a substantially U-shaped metal body 12 made from sheet strap material and providing opposed clamping legs 13 which are inherently resilient and are slightly outwardly curved. Each leg 13 has the notched edges 14 for the fitting about the same of a rubber sleeve 15 so that this sleeve 15 will be seated in the notches 14 and will encircle or embrace its leg preventing the clip from slipping or pulling off from the said reel or spool.

The ends of the legs 13 are folded on themselves at the corners thereof as at 16 while in the body 12 between the legs 13 are spaced transverse slots 17 and 18, respectively, for accommodating the threading of the outer free end of the film B therethrough, the diagonal terminal 11 of this film permitting the convenient insertion and threading of the said film in the slots 17 and 18. One bordering edge of the slot 17 is outwardly struck to form a piloting mouth 19 for the film on the initial insertion thereof in the clip.

The film B when having its end threaded through the slots 17 and 18 of the clip, the latter is positioned to straddle the reel or spool 10 and the legs 13 with the sleeves 15 thereon will frictionally clip the cheeks 10 of the said spool A thus holding the end of the film fastened to retain such film wound upon the spool or reel.

In Figure 6 of the drawing there is shown a slight modification wherein the end 20 of each leg is thickened in contradistinction to the folding over of the corners as at 16 in Figure 5 of the drawing.

In Figures 7 and 8 of the drawing there is shown a slight further modification wherein each leg has its end 21 rounded and struck therefrom for a reinforcing bead 22.

In Figure 9 of the drawing there is shown a still further modification wherein the clip has the intermediate body portion 23 joining the legs 24 abruptly bent at 25 and the legs 24 being in outwardly convergent relation to each other.

The application of the clip for the fastening of the end of the film B upon the spool or reel A is clearly shown in Figures 1 to 4 inclusive of the drawing.

When the end of the film B is retained for the clip the possibility of the jumping off of the film from the spool or reel by reason of the slackening in the winding thereof thereon will be avoided and also there is no liability of the twisting or tangling of the film when a person is feeding the same into a projecting machine. The clip in the use thereof will retain the film tightly wound upon the spool or reel and scratching, marring or otherwise damaging of such film will be avoided.

What is claimed is:

1. A clip for picture reels comprising a substantially U-shaped member provided with a pair of parallel slots in the bight thereof through which the film is adapted to be threaded, said member on the outer side of one of said slots being outwardly offset, each leg of said member having a reduced intermediate portion, and a yieldable sleeve engaging each leg about said reduced portion.

2. A clip for picture reels comprising a substantially U-shaped member provided with a pair of parallel slots in the bight thereof through which the film is adapted to be threaded, each leg of said member having a reduced intermediate portion, and a yieldable sleeve engaging each leg about said reduced portion.

3. A clip for picture reels comprising a substantially U-shaped member provided with a pair of parallel slots in the bight thereof through which the film is adapted to be threaded, each leg of said member having a reduced intermediate portion, and a yieldable ribbed sleeve engaging each leg about said reduced portion.

JOHN SYDNEY MacDONALD.